No. 778,670.       Patented December 27, 1904.

UNITED STATES PATENT OFFICE.

MICHAEL JLJINSKY, OF KREFELD, GERMANY.

ORTHO-DIOXYANTHRAQUINONE-SULFO ACID AND PROCESS OF MAKING SAME.

SPECIFICATION forming part of Letters Patent No. 778,670, dated December 27, 1904.

Application filed December 29, 1903. Serial No. 187,011. (Specimens.)

*To all whom it may concern:*

Be it known that I, MICHAEL JLJINSKY, a subject of the Czar of Russia, residing in Krefeld, Germany, have invented a Process of Producing Ortho-Oxyanthraquinone and Ortho-Oxyanthraquinone Oxysulfonic Acids, of which the following is a specification.

The 1.5 and 1.8 anthraquinone disulfonic acids, which hitherto could be produced only with difficulty from corresponding anthracene sulfonic acids, have been made easily obtainable by the process of my patent application Serial No. 165,426. The ortho-anthraquinone monosulfonic acid, previously unknown, but producible according to the invention of my said application, can also be obtained in any desired quantity. Contrary to the alkaline melt of the meta-anthraquinone sulfonic acids the alkaline melt of the ortho-anthraquinone sulfonic acids does not by any means pass off smoothly. The exchange of the sulfo groups for hydroxyl does indeed take place; but simultaneously there occurs a vigorous decomposition of the anthraquinone nucleus. At the same time a partial formation of more highly hydroxylized combinations cannot be avoided; but the non-coloring ortho-oxyanthraquinones answering directly to the corresponding ortho-anthraquinone sulfonic acids represent, as is known, an important foundation material for coloring-matters.

Now, as has been shown by investigations, the ortho or orthometa anthraquinone sulfonic acids which can be obtained according to the invention of my application referred to may be smoothly transferred, by means of earth alkali, into the corresponding oxy derivatives, especially if care is taken to avoid the appearance of free alkali in the melt. I attain this end by either using the pure earth-alkali salts of the corresponding sulfo salts or, in case sulfonic-acid alkali salts are employed, by adding suitable earth chlorid to the earth-alkali melt, (for instance, calcium chlorid in the case of a lime melt,) which earth chlorid, with the alkali appearing in the course of the reaction, is converted into alkali chlorid and earth hydroxid. If, on the other hand, the easily-soluble mother-liquor sulfo salts are melted (example II of my application referred to) with milk of lime under pressure and without addition of calcium chlorid, there are obtained after precipitating with muriatic acid, besides an always dark mother-liquor, only small viscous dark-greenish products, since the principal mass of the sulfonic acids employed is destroyed by the reducing action in the melt. However, the same lime melt takes quite a different course in the presence of calcium chlorid. After precipitating with muriatic acid there result the pure yellow flocks of the oxy bodies in sufficiently plentiful quantity. The mother-liquor then is also normally light. If saltpeter, chlorate of potash, or similar oxidation media are furthermore added to the lime melt, a reduction is wholly avoided and the yield, as well as the purity, of the products increased. Contrary to experience with the alkali melt, no further hydroxyl here enters into the molecule in presence of the oxidation means referred to.

The essential feature of my invention consists, therefore, in melting the said substances with compounds of earth alkalis, especially with hydroxids of earth alkalis, which hydroxids may be used, however, in combination with corresponding earth-alkali salts, especially earth chlorids.

The manner of carrying out the earth-alkali melts is illustrated in the following examples:

Example I: One hundred parts of technical ortho-anthraquinone sulfonate of potash are mixed with double the quantity of hot water, twenty parts of lime slaked therein. Thereupon thirty parts of saltpeter and two hundred parts of twenty-per-cent. calcium chlorid are added and the whole kept at 180° to 200° for about ten hours in the autoclave while stirring. After it is drawn off from the vessel, diluted with water, and precipitation is produced by muriatic acid there result about sixty-six parts of pure erythro oxyanthraquinone.

Example II: One hundred parts of 1.5 anthraquinone disulfonate of lime are mixed with five hundred parts of hot water, one hundred parts of lime slaked therein. Thereupon thirty parts of saltpeter and one hundred parts twenty-per-cent. solution of calcium chlorid are added and the whole kept under pressure in the autoclave at 180° to 200° until no more oxysulfo-acid is found. After it is drawn from the vessel and precipitation is produced by muriatic acid there result about fifty parts of pure anthrarufin.

Example III: One hundred parts of easily-soluble mother-liquor sulfo salt or the whole sulfo salt (example II of the application referred to) is dissolved in four hundred parts of hot water, one hundred parts of lime slaked therein. Thereupon thirty parts of saltpeter and two hundred parts of twenty-per-cent. solution of calcium chlorid are added and the whole heated to about 200° in the autoclave for ten hours while stirring. After it is drawn from the vessel and precipitation is produced by muriatic acid there is separated in yellow flocks a mixture of metabenzo dioxyanthraquinone, anthrarufin, and chrysazin, which bodies are separated by the usual methods. From the acid mother-liquor of these bodies there is separated, by means of common salt or chlorid of potash, a hitherto-unknown oxysulfo-acid, which dyes mordanted wool a fine violet-red and forms easily-soluble alkali salts and difficultly-soluble earth-alkali salts from which the barium salt $C_{28}H_{14}S_2Ba$ forms orange-colored needles difficultly soluble in cold water.

In the following claims I use the expression "alkali salts" in a sufficiently broad sense to include corresponding earth-alkali salts.

I claim as my invention—

1. The process herein described of converting the ortho-anthraquinone sulfonic acids into the corresponding oxy derivatives, said process consisting in heating under pressure in the presence of water the alkali salts of the said sulfonic acids with compounds of the alkaline earths.

2. The process herein described of converting the ortho-anthraquinone sulfonic acids into the corresponding oxy derivatives, said process consisting in heating under pressure in the presence of water the alkali salts of the ortho-anthraquinone sulfonic acids with compounds of the alkaline earths, with the addition of oxidizing means.

3. As a new compound an ortho-dioxy-anthraquinone-mono-sulfo acid dyeing mordanted wool well violet-red, and forming easily-soluble alkali salts and difficultly-soluble earth-alkali salts from which the barium salt $C_{28}H_{14}S_2Ba$ forms orange-colored needles difficultly soluble in cold water.

In testimony whereof I have signed my name to this specification in the presence of two subscribing witnesses.

MICHAEL JLJINSKY

Witnesses:
W. BRUCE WALLACE,
FRAU Dr. RUDENBERG.